US009464384B2

(12) United States Patent
Uehara et al.

(10) Patent No.: US 9,464,384 B2
(45) Date of Patent: Oct. 11, 2016

(54) WATER-RESISTANT/OIL-RESISTANT AGENT FOR PAPER

(71) Applicant: DAIKIN INDUSTRIES, LTD., Osaka-shi, Osaka (JP)

(72) Inventors: Tetsuya Uehara, Settsu (JP); Kayo Kusumi, Settsu (JP); Michio Matsuda, Settsu (JP)

(73) Assignee: DAIKIN INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/385,333

(22) PCT Filed: Mar. 14, 2013

(86) PCT No.: PCT/JP2013/057186
§ 371 (c)(1),
(2) Date: Sep. 15, 2014

(87) PCT Pub. No.: WO2013/137386
PCT Pub. Date: Sep. 19, 2013

(65) Prior Publication Data
US 2015/0096699 A1 Apr. 9, 2015

(30) Foreign Application Priority Data
Mar. 16, 2012 (JP) ................................. 2012-060215

(51) Int. Cl.
*D21H 21/16* (2006.01)
*D21H 23/04* (2006.01)
*D21H 23/22* (2006.01)
*D21H 17/33* (2006.01)
*D21H 17/36* (2006.01)
*C08F 220/24* (2006.01)
*C08F 220/22* (2006.01)
*C08L 71/02* (2006.01)
*D21H 17/11* (2006.01)
*D21H 17/37* (2006.01)
*D21H 17/00* (2006.01)
*D21H 19/20* (2006.01)
*D21H 19/12* (2006.01)

(52) U.S. Cl.
CPC .............. *D21H 21/16* (2013.01); *C08F 220/22* (2013.01); *C08F 220/24* (2013.01); *C08L 71/02* (2013.01); *D21H 17/11* (2013.01); *D21H 17/36* (2013.01); *D21H 17/37* (2013.01); *D21H 17/72* (2013.01); *D21H 19/12* (2013.01); *D21H 19/20* (2013.01)

(58) Field of Classification Search
None
See application file for complete search history.

(56) References Cited

U.S. PATENT DOCUMENTS

| 4,366,299 | A | * | 12/1982 | Dessaint | 526/243 |
|---|---|---|---|---|---|
| 5,344,903 | A | | 9/1994 | Raiford et al. | |
| 6,447,588 | B1 | | 9/2002 | Funaki et al. | |
| 7,485,688 | B2 | | 2/2009 | Maekawa et al. | |
| 8,992,733 | B2 | * | 3/2015 | Uehara et al. | 162/168.7 |
| 2004/0087695 | A1 | | 5/2004 | Sugimoto et al. | |
| 2005/0234205 | A1 | | 10/2005 | Yamaguchi et al. | |
| 2006/0148353 | A1 | | 7/2006 | Aga et al. | |
| 2008/0071025 | A1 | | 3/2008 | Sagawa et al. | |
| 2009/0155600 | A1 | * | 6/2009 | Usugaya et al. | 428/421 |
| 2010/0224817 | A1 | | 9/2010 | Jin et al. | |
| 2011/0027593 | A1 | * | 2/2011 | Matsuda et al. | 428/421 |
| 2012/0171495 | A1 | | 7/2012 | Masuda et al. | |
| 2012/0180969 | A1 | * | 7/2012 | Matsuda et al. | 162/164.6 |
| 2012/0285645 | A1 | * | 11/2012 | Kusumi et al. | 162/164.7 |

FOREIGN PATENT DOCUMENTS

| CN | 1120847 A | 4/1996 |
|---|---|---|
| CN | 1302319 A | 7/2001 |
| CN | 1503833 A | 6/2004 |
| EP | 2 295 479 A1 | 3/2011 |
| JP | 2005-344032 A | 12/2005 |
| JP | 2009-108296 A | 5/2009 |
| JP | 2009-173752 A | 8/2009 |
| JP | 2013-503267 A | 1/2013 |
| WO | 03/106519 A1 | 12/2003 |
| WO | 2004/069924 A1 | 8/2004 |
| WO | 2005/090423 A1 | 9/2005 |
| WO | WO 2011/099650 A1 * | 8/2011 |

OTHER PUBLICATIONS

International Preliminary Report on Patentability dated Sep. 25, 2014 from the International Searching Authority in counterpart application No. PCT/JP2013/057186.
International Search Report for PCT/JP2013/057186 dated Jun. 11, 2013 [PCT/ISA/210].
Extended European Search Report dated Jul. 13, 2015, issued by the European Patent Office in counterpart application No. 13761072.1.

* cited by examiner

*Primary Examiner* — Dennis Cordray
(74) *Attorney, Agent, or Firm* — Sughrue Mion, PLLC

(57) ABSTRACT

A water-resistant/oil-resistant agent for paper containing (I) a fluorine-containing copolymer including repeating units derived from: (a) a fluorine-containing monomer that has a fluoroalkyl group and that is represented by general formula (1): $CH_2=C(-X)-C(=O)-Y-Z-Rf$ (where X is a hydrogen atom, a linear or branched alkyl group having 1-21 carbon atoms, a fluorine atom, a chlorine atom, a bromine atom, an iodine atom, or the like; Y is —O— or —NH—; Z is an aliphatic group having 1-10 carbon atoms, an aromatic group having 6-10 carbon atoms, a cycloaliphatic group, or the like; and Rf is a linear or branched fluoroalkyl group having 1-6 carbon atoms), and (b) a (meth)acrylate monomer containing no fluorine atoms; and (II) a polypropylene glycol compound. Also disclosed is a method for treating paper, a treated paper and a composition for treating paper containing the water-resistant/oil resistant agent.

18 Claims, No Drawings

WATER-RESISTANT/OIL-RESISTANT AGENT FOR PAPER

CROSS REFERENCE TO RELATED APPLICATIONS

This is a National Stage of International Application No. PCT/JP2013/057186 filed Mar. 14, 2013, claiming priority based on Japanese Patent Application No. 2012-060215 filed Mar. 16, 2012, the contents of all of which are incorporated herein by reference in their entirety.

TECHNICAL FIELD

The present invention is related to a water- and oil-resistant agent for paper, a treatment method by the agent and the treated paper therewith.

BACKGROUND ART

The copolymer composition comprising a long chain C6-C12 polyfluoroalkyl group (hereinafter referred to as "Rf group") has been utilized previously as the water- and oil-resistant agent for paper. On the other hand, US EPA (United State Environment Protection Agency) pointed out that the long chain Rf group produces perfluoro-octanoic acid (hereinafter referred to as "PFOA") which might cause an influence on the environment. Therefore, many efforts have been made to develop a water- and oil-resistant agent for paper by using a fluorine-containing copolymer having a short chain Rf group. The water resistance and the oil resistance, however, tend to decrease along with the decrease of the carbon number of the Rf group, and the water- and oil-resistance is not satisfactory. So, further improvements have to be made to provide a paper having an enough water- and oil-resistance.

For example, Maekawa et. al. proposed a water- and oil-resistant composition comprising a fluorine-containing copolymer which comprises a fluorine-containing (meth) acrylate monomer having preferably a $C_1$ to $C_6$ Rf group, a cationic nitrogen-containing monomer such as diethylaminoethyl methacrylate, and polyoxyethyleneglycol mono (meth)acrylate (WO2005/090423A1). This water- and oil-resistant composition has the problem that bubbles of the aqueous solution are easily caused because of containing polyoxyethyleneglycol mono(meth)acrylate having high hydrophilicity, although water- and oil-resistance of the paper is improved.

PRIOR ARTS DOCUMENTS

Patent Documents

Patent Document 1: WO2005/090423 A1

DISCLOSURE OF THE INVENTION

Problems to be Solved by the Invention

An object of the present invention is to provide a water- and oil-resistant agent for paper, which has less bubbles and excellent product stability.

Means for Solving the Problems

Surprisingly, the present inventors discovered that, when a composition comprising at least one polypropylene glycol or derivatives thereof (i.e., a polypropylene glycol compound) is added to an aqueous solution of a fluorine-containing copolymer, the aqueous solution exhibits a superior defoaming effect and a superior bubble prevention effect, and maintains a product stability, thus completed the present invention.

The present invention provides a composition (for example, a surface treatment agent, especially a water- and oil-resistant agent for paper) comprising:
(I) a fluorine-containing copolymer comprising repeating units derived from:
(a) a fluorine-containing monomer having a fluoroalkyl group, represented by the general formula:

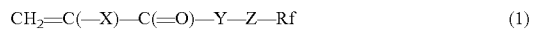

$$CH_2\!=\!C(\!-\!X)\!-\!C(\!=\!O)\!-\!Y\!-\!Z\!-\!Rf \qquad (1)$$

wherein
X is a hydrogen atom, a linear or branched alkyl group having 1 to 21 carbon atoms, a fluorine atom, a chlorine atom, a bromine atom, an iodine atom, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group;
Y is —O— or —NH— group;
Z is an aliphatic group having 1 to 10 carbon atoms, an aromatic or cycloaliphatic group having 6 to 10 carbon atoms,
a —CH$_2$CH$_2$N(R$^1$)SO$_2$— group wherein R$^1$ is an alkyl group having 1 to 4 carbon atoms,
a —CH$_2$CH(OZ$^1$)CH$_2$— group wherein Z$^1$ is a hydrogen atom or an acetyl group,
a —(CH$_2$)$_m$—SO$_2$—(CH$_2$)$_n$— group or a —(CH$_2$)$_m$—S—(CH$_2$)$_n$— group wherein m is 1 to 10 and n is 0 to 10, and
Rf is a linear or branched fluoroalkyl group having 1 to 6 carbon atoms, and
(b) a (meth)acrylate monomer which does not contain a fluorine atom, and (II) a polypropylene glycol compound.

In the present invention, the fluorine-containing polymer may contain one or both of
(c) a monomer having an anion donating group, and/or
(d) a monomer represented by the general formula:

(3)

wherein $R^{21}$, $R^{22}$, $R^{23}$, $R^{24}$, $R^{25}$ and $R^{26}$ are, the same or different, a hydrogen atom or an alkyl group having 1 to 4 carbon atoms.

The present invention also provides a method for treating paper with the above-mentioned water- and oil-resistant agent, and also provides a water- and oil-resistant paper obtained by said treatment method.

Effect of the Invention

The present invention provides the water- and oil-resistant agent comprising a fluorine-containing copolymer, which agent has less bubble and affords the superior water- and oil-resistance to the paper. The present invention provides the method for treating the paper with the water- and oil-resistant agent and the water- and oil-resistive paper obtained by utilizing the water- and oil-resistant agent.

Mode for Carrying Out the Invention

The water- and oil-resistant agent for paper of the present invention contains the polypropylene glycol compound (II), namely polypropylene glycol and/or derivatives thereof (II), in addition to the fluorine-containing copolymer (I) (e.g., a fluorine-containing polymer dispersion, particularly an aqueous dispersion of fluorine-containing polymer). Preferably, the fluorine-containing polymer dispersion contains water the fluorine-containing copolymer (I) and the polypropylene glycol compound (II). In the fluorine-containing polymer dispersion, the concentration of the fluorine-containing copolymer may be 0.01 to 70% by weight, e.g., 0.1 to 40% by weight, particularly 0.2 to 30% by weight. The concentration of the polypropylene glycol compound (II) in the fluorine-containing copolymer dispersion may be 0.01 to 15% by weight, preferably 0.1 to 10% by weight, more preferably 0.3 to 5% by weight.

The fluorine-containing copolymer used in the present invention is explained as follows. The fluorine-containing monomer (a) may be substituted by, for example, a halogen atom at its α-position. Therefore, X in the formula (1) may be a linear or branched $C_1$ to $C_{21}$ alkyl group, a fluorine atom, a chlorine atom, a bromine atom, an iodine atom, a $CFX^1X^2$ group (wherein $X^1$ and $X^2$ are a hydrogen atom, a fluorine atom, a chlorine atom, a bromine atom or an iodine atom), a cyano group, a linear or branched $C_1$-$C_{21}$ fluoroalkyl group, a substituted or non-substituted benzyl group, or a substituted or non-substituted phenyl group.

In the formula (1), the Rf group is preferably a perfluoroalkyl group. The carbon number of the Rf group may be 1 to 6, particularly 4 to 6, and especially 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$ and —$(CF_2)_3CF(CF_3)_2$. Especially, —$(CF_2)_5CF_3$ is preferable.

Non-limiting examples of the fluorine-containing monomer (a) are exemplified as follows:

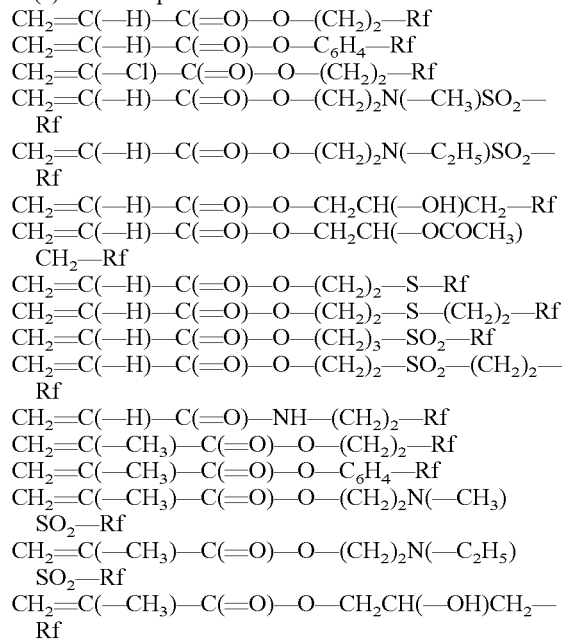
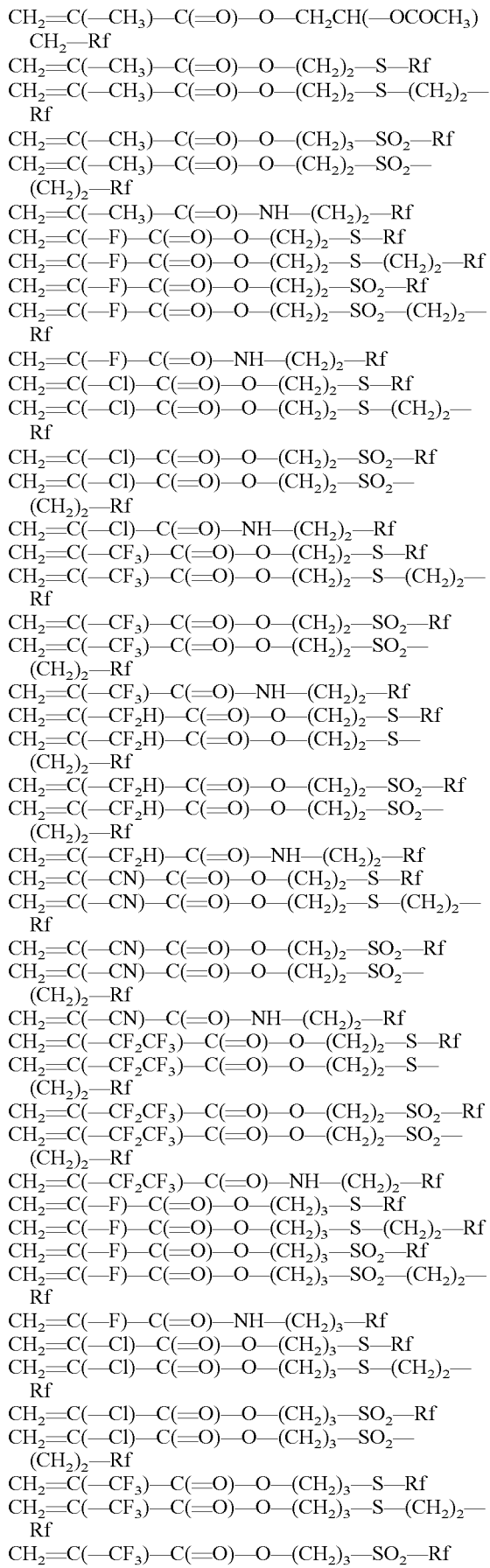

CH$_2$=C(—CF$_3$)—C(=O)—O—(CH$_2$)$_3$—SO$_2$—
   (CH$_2$)$_2$—Rf
CH$_2$=C(—CF$_2$H)—C(=O)—O—(CH$_2$)$_3$—S—Rf
CH$_2$=C(—CF$_2$H)—C(=O)—O—(CH$_2$)$_3$—S—
   (CH$_2$)$_2$—Rf
CH$_2$=C(—CF$_2$H)—C(=O)—O—(CH$_2$)$_3$—SO$_2$—Rf
CH$_2$=C(—CF$_2$H)—C(=O)—O—(CH$_2$)$_3$—SO$_2$—
   (CH$_2$)$_2$—Rf
CH$_2$=C(—CN)—C(=O)—O—(CH$_2$)$_3$—S—Rf
CH$_2$=C(—CN)—C(=O)—O—(CH$_2$)$_3$—S—(CH$_2$)$_2$—
   Rf
CH$_2$=C(—CN)—C(=O)—O—(CH$_2$)$_3$—SO$_2$—Rf
CH$_2$=C(—CN)—C(=O)—O—(CH$_2$)$_3$—SO$_2$—
   (CH$_2$)$_2$—Rf
CH$_2$=C(—CF$_2$CF$_3$)—C(=O)—O—(CH$_2$)$_3$—S—Rf
CH$_2$=C(—CF$_2$CF$_3$)—C(=O)—O—(CH$_2$)$_3$—S—
   (CH$_2$)$_2$—Rf
CH$_2$=C(—CF$_2$CF$_3$)—C(=O)—O—(CH$_2$)$_3$—SO$_2$—Rf
CH$_2$=C(—CF$_2$CF$_3$)—C(=O)—O—(CH$_2$)$_2$—SO$_2$—
   (CH$_2$)$_2$—Rf wherein Rf is a C$_1$-C$_6$, preferably C$_4$-C$_6$ fluoroalkyl group.

The fluoroalkyl group (Rf) in the fluorine-containing monomer (a) may be, preferably a perfluoroalkyl group, more preferably a C$_4$-C$_6$ perfluoroalkyl group.

The fluorine-containing monomer (a) may be a mixture of two or more types of monomers.

The fluorine-free monomer (b) is a (meth)acrylate monomer which does not contain a fluorine atom. The fluorine-free monomer may be an acrylate represented by the formula:

CH$_2$=CA$^1$COOA$^2$ wherein A$^1$ is a hydrogen atom, a methyl group, or a halogen atom (for example, a chlorine atom, a bromine atom and an iodine atom) other than a fluorine atom, and A$^2$ is a monovalent organic group.

The examples of A$^2$ may be an oxyalkylene group (having, e.g., 1 to 300 carbon atoms), an alkyl group (having 1 to 30 carbon atoms), and may be a monovalent organic group having an amino group, an ester group or a urethane group (for example, —(CH$_2$)$_p$NR$_2$R$_3$, —(CH$_2$)$_p$COOR$_4$ or —(CH$_2$)$_p$OCONHR$_5$ wherein, R$_2$, R$_3$ and R$_5$ are, the same or different, an hydrogen atom or an alkyl group (having 1 to 30 carbon atoms (e.g., 1 to 4 carbon atoms)), R$_4$ is an alkyl group (having 1 to 30 carbon atoms (e.g., 1 to 4 carbon atoms)), and p is 0 to 30, e.g., 1 to 20, particularly 2 to 20.). The A$^2$ group may have at least one (e.g., 1 to 10) hydroxyl group.

The fluorine-free monomer (b) may be at least one selected from the group consisting of oxyalkylene(meth) acrylate or oxyalkylene di(meth)acrylate and trimethylolpropane di(meth)acrylate, pentaerythritol tri(meth)acrylate, methyl (meth)acrylate, n-butyl (meth)acrylate, t-butyl (meth)acrylate, 2-ethylhexyl(meth)acrylate, lauryl(meth) acrylate, stearyl(meth)acrylate and behenyl(meth)acrylate.

The oxyalkylene(meth)acrylate or oxyalkylene di(meth) acrylate may be compounds represented by the general formulas:

CH$_2$=CX$^1$C(=O)—O—(RO)$_n$—X$^2$  (b1)

and

CH$_2$=CX$^1$C(=O)—O—(RO)$_n$—C(=O)CX$^1$=CH$_2$  (b2)

wherein X$^1$ is a hydrogen atom or a methyl group,
X$^2$ is a hydrogen atom or a saturated or unsaturated C$_1$-C$_{22}$ hydrocarbon group,
R is a C$_2$-C$_6$ alkylene group, and
n is an integer from 1 to 90.

Preferably, the fluorine-free monomer may be oxyalkylene(meth)acrylate represented by the general formula (b1) wherein X$^2$ is a hydrogen atom, R is a saturated hydrocarbon group having 2 carbon atoms, and n is an average of 10 or less, and may be particularly preferably one or a mixture of 2-hydroxyethyl methacrylate and ω-hydroxy-polyoxyethylene acrylate (an average polymerization degree (n) of the polyoxyethylene groups is 3 to 10.). Examples of ω-hydroxy-polyoxyethylene acrylate include BLEMMER AE-200 (n=4.5) manufactured by NOF Corporation.

The monomer (c) is a compound having an anion-donating group and a carbon-carbon double bond. The anion-donating group may be a carboxyl group or a sulfonic acid group. The monomer (c) may be preferably at least one selected from the group consisting of (meth)acrylic acid, crotonic acid, maleic acid, fumaric acid, itaconic cid, citraconic acid, vinylsulfonic acid, (meth)allylsulfonic acid, styrene sulfonic acid, vinylbenzene sulfonic acid, acrylamide-tert-butylsulfonic acid, and salts thereof. The especially preferable monomer (c) is (meth)acrylic acid.

The vinyl pyrrolidone monomer (d) represented by a general formula (3) is an N-vinyl-2-pyrrolidone compound which may have an alkyl substituent having 1 to 4 carbon atoms, preferably a methyl group, on ring. The number of the alkyl substituents on the ring is 0 to 6. Preferably, the vinyl pyrrolidone monomer (d) is at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone.

Each of the monomers (a), (b), (c) and (d) may be alone or a mixture of at least two. In the fluorine-containing copolymer, the amount of the monomer (b) may be 1 to 300 parts by weight, for example, 5 to 100 parts by weight, the amount of the monomer (c) may be 0 to 80 parts by weight, for example, 1 to 40 parts by weight, the amount of the monomer (d) may be 0 to 80 parts by weight, for example, 1 to 40 parts by weight, based on 100 parts by weight of monomer (a).

An example of the weight ratio of the monomers (a):(b): (c):(d) includes 50-85:1-50:0-15:0-25, for example, 60-80: 2-15:1-10:1-20.

In the present invention, a molecular weight of the fluorine-containing copolymer is not limited. With considering the water- and oil-resistance properties and the viscosity of the paper treatment agent, the mass-average molecular weight (in terms of polystyrene) measured by GPC (gel permeation chromatography) is generally 3,000 or more, and preferably, in the range of 5,000 to 1,000,000.

The fluorine-containing copolymer in the present invention may be in the form of an aqueous dispersion dispersed in water, and may be self-emulsified, may be dispersed in water in form of a neutralized salt or may be emulsified by using an emulsifier.

The fluorine-containing polymer in the present invention can be prepared by any of conventional polymerization methods. Conditions for polymerization reaction can be arbitrarily selected. The polymerization method includes, for example, a solution polymerization, a suspension polymerization and an emulsion polymerization.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, 4,4-azobis(4-cyano pentanoic acid), dimethyl 2,2-azobismethyl propionate, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer(s) and dissolves the monomer(s), and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight, based on 100 parts by weight of the monomers.

In order to obtain a polymer dispersion in water, which is superior in storage stability, it is desirable that the monomers are emulsified in water by using an emulsifying device capable of applying a strong shattering energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

In the case that the fluorine-containing copolymer of the present invention comprises a monomer having an anion-donating group such as a carboxyl group or sulfonic acid group, the fluorine-containing copolymer can be neutralized by alkali resulting in the aqueous dispersion in the form of a salt. Therefore, the amount of a volatile solvent can be reduced or eliminated to eventually afford an environmentally-benign water- and oil-resistant agent for paper.

The polypropylene glycol compound (II) in the present invention is polypropylene glycol and/or a derivative thereof. The average molecular weight of the polypropylene glycol compound (II) is 100 to 10,000 preferably 300 to 5,000, more preferably 500 to 3,000.

The average molecular weight (number-average molecular weight) of the polypropylene glycol compound (II) is determined by using a gel permeation chromatography under the following conditions.
  Developing solvent: DMF
  Flow speed: 0.7 mL/min
  Column: 2 columns of PLgel MIXED-D
  Column temperature: 65° C.
  Detector: RI (manufactured by Shodex)
  Sample amount: 1 mg/mL, 100 μL Generally, the polypropylene glycol derivative is a compound having a polyoxypropylene group and another polyoxyalkylene group (the carbon atom number of the alkylene groups is 2-6, preferably 2 or 4). The weight ratio of the polyoxypropylene group and the other polyoxyalkylene group may be from 99:1 to 30:70, for example, from 95:5 to 40:60, particularly from 90:10 to 60:40. A polypropylene glycol derivative which was prepared by adding ethylene oxide to both ends of a polypropylene glycol molecule also can be preferably used. Examples of the derivative include an adduct of alkylene oxide (except propylene oxide) (the alkylene (except propylene) has e.g., 2 to 4 (specifically 2 or 4) carbon atoms and the amount of the alkylene oxide may be 1 to 60% by weight, particularly 3 to 50% by weight, based on the derivative), for example, an ethylene oxide adduct (for example, the amount of the ethylene oxide may be 5 to 60% by weight, based on the derivative) or a butylene oxide adduct (for example, the amount of the butylene oxide may be 5 to 30% weight, based on the derivative). The polypropylene glycol derivative which can be preferably used for present invention includes:
a derivative wherein ethylene oxide is added to both ends of
  polypropylene glycol having an average molecular weight
  of 100 to 10,000, preferably 300 to 5,000, more preferably
  500 to 3,000 and wherein the addition ratio of said
  ethylene oxide is 15 mass % or less, preferably 12 mass
  % or less, more preferably 10 mass % or less, based on the
  average molecular weight of the polypropylene glycol
  derivative, and
a derivative wherein ethylene oxide is added to both ends of
  polypropylene glycol having an average molecular weight of
  1,000 to 2,500, preferably 1,500 to 2,300, more preferably
  1,800 to 2,100 and wherein the addition ratio of said
  ethylene oxide is larger than the above-mentioned amounts,
  and the addition ratio of said ethylene oxide is 30 mass % or
  less, preferably 25 mass % or less, more preferably 20 mass
  % or less, based on the average molecular weight of the
  polypropylene glycol derivative. In present invention, the "average molecular weight" of the polypropylene glycol compound (II) means a number-average molecular weight.

Specific examples of the polypropylene glycol derivative which are particularly preferable include; among polyoxyethylene polyoxypropylene block polymers, a compound wherein the average molecular weight of the polypropylene glycol moiety is 900, and the ethylene oxide addition rate is 10%; a compound wherein the average molecular weight of the polypropylene glycol moiety is 1,800 and the ethylene oxide addition rate is 10%; a compound wherein the average molecular weight of the polypropylene glycol moiety is 3,000, and the ethylene oxide addition rate is 10%; a compound wherein the average molecular weight of the polypropylene glycol moiety is 1,800, and the ethylene oxide addition rate is 20%; a compound wherein the average molecular weight of the polypropylene glycol moiety is 2,100, and the ethylene oxide addition rate is 20%; but the polypropylene glycol derivative is not limited to these. Herein, the "addition rate" of the ethylene oxide means an addition ratio (by mass) of ethylene oxide ($—C_2H_4O—$) units occupied in the average molecular weight of polypropylene glycol derivative.

The polypropylene glycol compound (II) may be alone or a mixture of at least two. The concentration of the polypropylene glycol compound (II) in the fluorine-containing copolymer dispersion of the present invention may be 0.01 to 15% by weight, preferably 0.1 to 10% by weight, more preferably 0.3 to 5% by weight.

The present invention also provides a method for treating paper to be water and oil-resistant, wherein the method comprises the step of applying the water- and oil-resistant agent of the present invention to the whole paper including internal parts of the paper. This treatment method is hereinafter referred to as an "internal application process". In this method, the water- and oil-resistant agent of the present invention comprising a fluorine-containing copolymer is applied to a pulp at a papermaking stage. Specifically, it is preferable to apply the water- and oil-resistant agent in an amount that the ratio of the fluorine atoms is, for example, 0.01 to 1.0% by weight based on the weight of the pulp.

The present invention also relates to a method for treating paper to be water and oil-resistant, wherein the method comprises the step of applying the water- and oil-resistant agent of the present invention to a surface of the paper. This treatment method is hereinafter referred to as "surface application process". In this method, it is preferable to apply the water- and oil-resistant agent comprising a fluorine-containing copolymer in an amount that the ratio of the fluorine atoms is, for example, 0.005 to 0.6% by weight based on the weight of the paper.

The water- and oil-resistant agent for paper of the present invention can be used in either of the surface application process or the internal application process. The internal application process in which the paper treatment agent is applied to the whole parts of the paper including internal parts is preferable since the internal application process provides a good compatibility of the water- and oil-resistant agent with the pulp, and thus the process can suppress the decrease of the water- and oil-resistance by a crease or a corrugation of the paper. On the other hand, the surface application process has a wide applicability, since, in the surface application process, (i) the water- and oil-resistant agent is applied to a nearby area around the surface of the paper and thus effectively improves the water- and oil-resistance around the surface by the fluorine-containing copolymer, (ii) the process does not need much water in the treatment step thus reducing the amount of a waste water, and (iii) the process is simple.

The present invention also provides a paper treatment composition comprising the water- and oil-resistant agent of the present invention. The paper treatment composition may comprise, in addition to the water- and oil-resistant agent for paper, an additive, for example, a sizing agent, a paper strengthening agent, a retention aid, a dyestuff, a pigment, an anti-slipping agent and a defoaming agent.

The present invention also provides a water- and oil-resistant paper treated with the water- and oil-resistant agent of the present invention.

The present invention also provides a paper obtained by the internal application process or the surface application process.

The production of the fluorine-containing copolymer of the present invention can be carried out by polymerizing monomers (a) and (b), and optionally used (c) and/or (d) in a liquid medium.

The liquid medium is preferably water-soluble or water-dispersible solvent. The liquid medium may be a mixture comprising the water-soluble or water-dispersible solvent. The monomer and the liquid medium preferably are in a form of a solution wherein the monomer is dissolved or dispersed in the liquid medium. The polymerization may be a solution polymerization or an emulsion polymerization, preferably a solution polymerization in view of stability of polymerization reaction.

In the present invention, the repeating units derived from the monomer (c) (the anion donating group) may be neutralized with a base (such as an aqueous solution of inorganic or organic base) after conducting the copolymerization; or the copolymerization may be carried out using the monomer (c) neutralized with the base in advance. When the monomers are polymerized after the monomer (c) is neutralized with the base in advance, the neutralization with a basic aqueous solution after copolymerization is not necessary (may not be conducted).

Examples of the inorganic or organic base includes sodium hydroxide, potassium hydroxide, ammonia, triethylamine, tri-n-propylamine, triisopropylamine, tri-n-butylamine, tri-sec-butylamine, ethanolamine, diethanolamine, triethanolamine, 2-amino-2-methyl-1-propanol, 2-aminoethyl-1,3-propanediol, 2-amino-2-hydroxymethyl-1,3-propanediol, bis(hydroxymethyl)methylaminomethane, tris(hydroxymethyl)aminomethane, lysine and arginine. Among these, for example, sodium hydroxide, potassium hydroxide, ammonia, triethylamine, diethanolamine and triethenolamine are preferable from the view point of the improvement of the dispersing stability of the obtained fluorine-containing copolymer in water or the aqueous medium.

The polymer mixture after copolymerization may be, if necessary, diluted by adding the liquid medium (for example, water or an aqueous solution containing inorganic or organic bases). Non-limiting examples of the water-soluble or water-dispersible organic solvents utilized in copolymerization include ketones (for example, acetone or methyl ethyl ketone), alcohols (for example, methanol, ethanol and isopropanol), ethers (for example, methyl or ethyl ether of ethylene glycol or propylene glycol, acetate ester thereof, tetrahydrofuran and dioxane), acetonitrile, dimethylformamide, N-methyl-2-pyrollidone, butylactone and dimethylsulfoxide. Among them, methyl ethyl ketone (MEK), N-methyl-2-pyrollidone (NMP), a mixture of N-methyl-2-pyrollidone and acetone, isopropanol or methanol is preferable as a solvent. The total monomer concentration in the solution may be in the range of 20 to 70 wt %, preferably, 40 to 60 wt %.

The copolymerization may be carried out by using at least one initiator in the range of 0.1 to 3.0 wt % based on the total weight of the monomers. The following initiators may be used: peroxides such as benzoyl peroxide, lauroyl peroxide, succinyl peroxide and tert-butyl perpivalate, or azo-compounds such as 2,2-azobis-isobutylonitrile, 4,4-azobis(4-cyanopentanoic acid) and azodicarbonamide.

A chain transfer agent may be used for controlling the molecular weight of the copolymer. As the chain transfer agent, alkylmercaptan (for example, dodecylmercaptan, laurylmercaptan and stearylmercaptan), aminoethanethiol, mercaptoethanol, thioglycollic acid, and 2-mercaptopropionic acid are preferably exemplified. The amount of the chain transfer agent used may be in the range of 0.001 to 5, preferably 0.01 to 2 parts by weight based on 100 parts by weight of the total monomers in the copolymerization.

The copolymerization can be carried out generally in the range from 40° C. to the boiling point of the reaction mixture.

The dilution step may be carried out by adding a liquid medium, for example, water or an aqueous solution of a strong or moderate inorganic or organic base into the organic solution of fluorine-containing copolymer in organic solvent. The above described bases are exemplified as such a base usable for the dilution step. Among them, sodium hydroxide or ammonia is preferably used. The amount of the aqueous solution and the concentration of the base are preferable to be sufficiently enough firstly to neutralize the carboxylic acid group or the sulfonic acid group and to obtain a stable aqueous dispersion.

In order to neutralize the carboxylic acid group and the sulfonic acid group, advantageously, the amount of base is in the range of 0.05 to 5 eq., preferably 0.1 to 3 eq., based on the monomer (c).

The final solid content of the fluorine-containing copolymer solution after dilution can take a wide range. For example, a range of 5 to 35% by weight, preferably 10 to 25% by weight can be selected.

The paper to which the water- and oil-resistant agent comprising the fluorine-containing copolymer of the present invention is to be applied can be produced by the conventional paper making method. Both processes may be used: the internal application process wherein the treating agent is added to the pulp slurry before paper making, and the surface application process wherein the treating agent is applied to the paper after paper making.

In case of applying the water- and oil-resistant agent of the present invention to the whole of paper including internal parts of the paper (the internal application process), it is preferable to use the water- and oil-resistant agent in such an amount that the weight ratio of the fluorine atoms is in the range of 0.01 to 1.0% by weight, especially, 0.02 to 0.6% by weight based on the weight of the pulp. On the other hand, when the water- and oil-resistant agent is applied to the surface of the paper (the surface application process), it is preferable to use the water- and oil-resistant agent in such amount that the weight ratio of the fluorine atoms is in the range of 0.005 to 0.6% by weight, for example, 0.01 to 0.4% by weight based on the weight of the paper.

The paper substrate thus treated exhibits a superior water- and oil-resistance generally after heat treatment at room temperature or at high temperature, or if necessary depending on the nature of the paper substrate, by accompanying a heat treatment which can be at a higher temperature range of 70° C. or more.

The paper substrate treated with the method of the present invention include a raw paper for plaster board, a coated raw paper, a wood-containing paper, a general liner and a flute, a neutral white role paper, a neutral liner, an anti-corrosion liner, a paper combined with metal and a kraft paper. The following paper substrate are further exemplified: a neutral paper for printing and writing, a neutral coated raw paper, a neutral paper for PPC, a neutral heat-sensitive paper, a neutral pressure-sensitive paper, a neutral paper for ink-jet, and a neutral paper for information industry. Other papers such as a mold paper formed by molding, especially, a molded paper vessel, are exemplified. A pulp-molded vessel can be produced by the process described in JP9-183429A.

The following materials can be utilized as a starting pulp materials for paper: a bleached or unbleached chemical pulp such as a kraft pulp or a sulfite pulp, a bleached or unbleached high-yield pulp such as a grand pulp, a mechanical pulp or a thermo-mechanical pulp, and a waste pulp such as a waste paper of newspaper, magazine, cardboard or delinked paper, non-wood pulp such as bagasse pulp, kenaf pulp or bamboo pulp. The mixtures may be also utilized between the pulp materials above mentioned and any one of synthetic fibers such as polyamide, polyimide, polyester, polyolefin and polyvinyl alcohol.

When the surface application process and the internal application process are applied, a size agent, in addition to the water- and oil-resistant agent, can be added optionally to improve the water resistance of the paper. The examples of the size agent are a cationic size agent, an anionic size agent and a rosin size agent (for example, an acidic rosin size agent, a neutral rosin size agent). Among them, a styrene-acrylic acid copolymer, alkenylsuccinic anhydride and an alkylketene dimer are preferable. The amount of the size agent may be 0.001 to 5 wt % based on the amount of the pulp.

If necessary, other agents generally added to the paper treatment agent may be used: for example, a paper strengthening agent such as starch, various modified starch, such as caroboxymethyl-cellulose, polyamidepolyamine-epichlorohydrin (PAE), polydiallyldimethylammonium chloride (poly-DADMAC) and polyacrylamide (PAM), a retention aid, a dyestuff, a fluorescent dyestuff, a filler, a slime-controlling agent, an anti-slipping agent and a defoaming agent.

In the surface application process, the paper treatment agents can be applied to the paper by means of a size press, coating (for example, a gate roll coater, a bill blade coater and a bar coater) and a spray apparatus.

EXAMPLES

The followings are examples which specifically explain the present invention. These examples are for the explanation of the present invention, but do not limit the present invention. The terms "parts" and "%" read, if not specified, "parts by weight (or pbw)" and "% by weight (or wt %)", respectively.

The test methods used are as follows:
Stability Test

The stability of the dispersion of fluorine-containing copolymer in water (an aqueous dispersion) was observed. An aqueous dispersion having a solid content being adjusted to 20 wt % was left standing for 7 days at room temperature in 110 mL transparent glass sample pot, and its dispersion state was visually observed by eyes whether a sedimentation or a coagulation occurred or not. The evaluation was summarized as follows: "Good" stands for absence of sedimentation, coagulation and liquid phase separation; "Fair" stands for slight sedimentation, aggregation or liquid phase separation; "Poor" stands for much sedimentation, coagulation or liquid phase separation.

Bubble Test

A liquid prepared by adding 3 g of a prepared fluorine-containing copolymer aqueous dispersion to 300 g of a 4% solution of ethylated starch (PenfordGum 290 manufactured by Penford Products Corp.) stirred and dissolved for 20 minutes or more in tap water beforehand heated at 80° C. or more was charged into a 1 L jug, and warmed at 60° C. on a water bath. The aqueous dispersion was pumped out by using an Iwaki magnet pump (type: MD-15RN), and bubbles are compulsorily generated by repeating a continuous return into the jug from a height of 20 cm from a surface. The height of the bubbles from the liquid surface is measured after this liquid circulation is performed for 30 minutes, and the evaluations are "Good" in the case of less than 10 cm, "Fair" in the case of less than 20 cm, and "Bad" in the case of 20 cm or more.

Water-Resistance Test (Cobb Test (JIS P8140))

The test consists of measuring the weight (g) of the water absorbed in 1 minute by the paper having 100 $cm^2$ area and supporting 1 cm height of water, and converting the measured value in terms of a weight per 1 $m^2$ ($g/m^2$).

Oil Resistance Test (Kit Test)

The oil resistance was measured according to TAPPI T-559 cm-02 method. One drop of the test oil shown in Table 1 was placed on a paper, then, after 15 seconds, the penetration state of the oil was observed. The maximum point of an oil resistance given by the oil having no penetration was assigned to be an oil resistance of the paper.

TABLE 1

| Oil resistance | Castor oil | Toluene | Heptane |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

AGR (Aggressive-grease Resistance) Test

This test is particularly useful to inspect the anti-grease paper suitability for the pet-food packaging. Briefly, this test implies the contact in standardized conditions between the pet-food and the paper specimen to be tested. Sciencediet (manufactured by Hill's Corp.) (Registered trade mark) was used as the pet-food for testing. The pet-food is finely milled in a mixer beforehand. An anti-grease paper specimen, having 10×10 cm sizes, is cut out to be tested, and placed over a coated paper sheet on which a grid of 100 small squares is printed, having a surface exactly equal to that of specimen to be tested. Before fitting the position on the grid, the specimen is slightly creased. First of all, the specimen is folded back along a line connecting the centers of the facing two edges, and the crease is reinforced by a proper roll (weight: 2450±110 g; diameter: 8 cm; width: 7 cm) covered with a hard rubber layer in 0.6 cm thickness having a controlled hardness. The roll speed is 50-60 cm/sec. during the creasing. The specimen is subjected to a first crease made along a line connecting centers of opposite edges of the specimen, and a second crease is made by creasing the paper along a line connecting centers of other opposite edges of the specimen. The specimen with the creases is transferred on the grid so that the specimen wholly covers the grid surface. A metal ring having a diameter of 7.2 cm and a height of 2.5 cm is placed in the middle of the paper specimen to be tested. Then 36 g of milled pet-food are taken, which are homogeneously paced inside the ring on the paper specimen to be tested. A weight equal to 1.5 kg, cylinder-shaped, is then placed on the milled pet-food applied to the paper specimen. The whole is put in a stove at 60° C. and 50% humidity for 24 hours. Then, the weight and the pet-food are removed, and the specimen surface is observed to find stains of fat penetration, which are generated on the coated paper sheet having the grid. The test result is expressed in terms of percentage of stained surface. The lower value indicates the lower exuding and better oil resistance. In order to obtain a significant result, the final value is the average of the results obtained on at least 4 specimens of the same sample.

RP-2 Test

This test is mainly utilized to inspect the suitability of the oil resistant paper for the pet-food packaging. An anti-grease paper specimen, having a size of 10 cm×10 cm, is cut out to be tested, and placed over a coated paper sheet, on which a grid of 100 small squares is printed, having a surface exactly equal to that of specimen to be tested. Before fitting the position on the grid, the specimen is slightly creased. First of all, the specimen is folded back along the line connecting the centers of the facing two edges, and the crease is reinforced by a proper roll (weight: 2450±110 g; diameter: 8 cm; width: 7 cm) covered with a hard rubber layer having 0.6 cm thickness and having a controlled hardness. The roll speed is 50-60 cm/sec. during the creasing. The specimen is subjected to a first crease made along a line connecting centers of opposite edges of the specimen, and a second crease is made by creasing the paper along a line connecting centers of other opposite edges of the specimen. The specimen with the creases is transferred on the grid so that the specimen wholly covers the grid surface. A plastic pipe (height: 2.5 cm, internal diameter: 2.5 cm) is placed in the middle of the specimen, then 5 g of sand (Sohma standard sand: 500-850 µm) are poured into the pipe. The pipe is then removed so as to form a sand cone in the middle of the specimen. Then 1.3 mL of a specific synthetic oil manufactured Ralston Purina which contains a red dye are added to the sand cone to leak into the cone. The specimens with the sand are then kept in a stove at 60° C. and 50% of relative humidity for 24 hours. At the end, the sand mound penetrated with the oil is removed, and the underlying grid surface of the coat paper stained by the colored oil is evaluated. The RP-2 test result is then expressed as number of stained small squares, which expresses also the % of the stained squares of the grid. The lower value indicates the lower exuding and better oil resistance. In order to obtain a significant result, the final value is the average of the results obtained on at least 4 specimens of the same sample.

Synthesis Example 1

Hundred (100) parts by weight of methyl ethyl ketone (MEK) as a solvent was introduced into a 300 mL reaction vessel equipped with a stirrer, a thermometer, a refluxing condenser, a dropping funnel, a nitrogen gas inlet and a heater. Then, with stirring, a monomer (totally 100 parts of the monomer) consisting of 72 parts of $F(CF_2)_6CH_2CH_2OCOCH=CH_2$ (hereinafter referred to as "C6FA"), 8 parts of N-vinyl-2-pyrrolidone (NVP), 15 parts of 2-hydroxyethyl methacrylate (HEMA) and 5 parts of acrylic acid (AA), and tert-butyl perpivalate as an initiator (1 part), were added in this order to obtain a mixture, which was further stirred for 12 hrs. under the nitrogen atmosphere at 60° C. to complete the copolymerization and cooled to the room temperature, thereby giving a solution (S1) of the fluorine-containing copolymer. The solid concentration of the obtained solution (S1) containing the copolymer was 50% by weight.

Synthesis Example 2

The copolymerization and post-processing were conducted as in Synthesis Example 1 except that a monomer (totally 100 parts of monomer) consisting of 72 parts of $F(CF_2)_6CH_2CH_2OCOCH=CH_2$ (C6FA), 8 parts of N-vinyl 2-pyrrolidone (NVP), 15 parts of 2-hydroxyethyl methacrylate (HEMA) and 5 parts of acrylic acid (AA), 0.03 parts of lauryl mercaptan (L-SH) as a chain transfer agent, and 1 part of t-butyl perpivalate as an initiator in this order were added, to obtain a fluorine-containing copolymer solution (S2).

Synthesis Example 3

The copolymerization and post-processing were conducted as in Synthesis Example 1 except that that 72 parts of $F(CF_2)_6CH_2CH_2OCOCH=CH_2$ (C6FA), 8 parts of N-vinyl-2-pyrrolidone (NVP), 10 parts of 2-hydroxyethyl methacrylate (HEMA), 8 parts of acrylic acid (AA), 2 parts of ω-hydroxy-polyoxyethylene acrylate (BLEMMER AE-200 manufactured NOF Corporation: the average polymerization degree of the polyoxyethylene group=4.5) and 1 part of tert-butyl perpivalate as an initiator were added in this order, to obtain a fluorine-containing copolymer solution (S3).

Synthesis Example 4

Hundred (100) parts by weight of methyl ethyl ketone (MEK) as a solvent was introduced into a 300 mL reaction vessel equipped with a stirrer, a thermometer, a refluxing condenser, a dropping funnel, a nitrogen gas inlet and a heater. Then, with stirring, a monomer (totally 100 parts of the monomer) consisting of 77 parts of $F(CF_2)_6CH_2CH_2OCOCH=CH_2$ (C6FA), 13 parts of 2-hydroxyethyl methacrylate (HEMA), 5 parts of ω-hydroxy-polyoxyethylene acrylate (BLEMMER AE-200 manufactured NOF Corporation: the average polymerization degree of the polyoxyethylene group=4.5) and 5 parts of methacrylic acid (MAA), and 4,4'-azobis(4-cyanopentanoic acid) as an initiator (0.5 parts) were added in this order to obtain a mixture, which was further stirred for 12 hrs. under the nitrogen atmosphere at 70° C. to complete the copolymerization. The solid concentration of the obtained solution (S4) containing the copolymer was 50% by weight.

Synthesis Example 5

The copolymerization was conducted as in Synthesis Example 4 except that lauryl mercaptan (L-SH) as a chain transfer agent was added in the amount of 0.1 parts and the initiator was changed to 0.5 parts of t-butyl perpivalate, to obtain a copolymer-containing solution (S5).

Synthesis Example 6

The copolymerization was conducted as in Synthesis Example 4 except that the amount of $F(CF_2)_6CH_2CH_2OCOCH=CH_2$ (C6FA) was changed to 74 parts, the amount of 2-hydroxyethyl methacrylate (HEMA) was changed to 16 parts and the initiator was changed to 0.5 parts of t-butyl perpivalate. The solid concentration of the obtained solution (S6) containing the copolymer was 50% by weight.

Preparation Example 1

A pale yellow transparent aqueous dispersion containing fluorine-containing copolymer (the content of the volatile organic solvent being less than 1% by weight) was obtained by adding 4.9 g of a 10% aqueous NaOH solution as a base and 90 g of an ion-exchanged water to the fluorine-containing copolymer solution (S1) (50 g) obtained in Synthesis Example 1, and evaporating MEK under reduced pressure by an evaporator with heating. To this aqueous dispersion was further added the ion-exchanged water to prepare an aqueous dispersion having a solid content of 20% by weight, to which 1% by weight of polypropyleneglycol having a number average molecular weight of 2,000 was added, and which was further sufficiently stirred to obtain aqueous dispersion (SD1).

The dispersion stability and the bubble test of SD1 obtained were evaluated in the above described method, and the obtained results are shown in Table 2.

Preparation Examples 2 and 3

Aqueous dispersions having a solid content of 20% by weight were prepared as in Preparation Example 1 by using the fluorine-containing copolymer solutions (S2 and S3) prepared in Synthesis Examples 2 and 3. Further, 1% by weight of polypropylene glycol having a number-average molecular weight of 1,000 was added to S2 and sufficiently stirred; and 1% by weight of polyoxyethylene polyoxypropylene block polymer having an number-average molecular weight of a polypropylene glycol moiety of 900 and an ethylene oxide addition rate of 10% was added to S3 and sufficiently stirred, to obtain aqueous dispersions (SD2 and SD3, respectively).

The dispersion stability and the bubble test of SD2 and SD3 obtained were evaluated in the above described method, and the obtained results are shown in Table 2.

Preparation Example 4

Using the fluorine-containing polymer solution (S1) obtained in Synthesis Example 1, the same procedures as in Preparation Example 1 were conducted to prepare an aqueous dispersion having a solid content of 20% by weight, and 3% by weight of polypropylene glycol having a number-average molecular weight of 2,000 was added to give an aqueous dispersion (SD4).

The dispersion stability and the bubble test of SD4 obtained were evaluated in the above described method, and the obtained results are shown in Table 2.

Preparation Example 5

A pale yellow transparent aqueous dispersion containing fluorine-containing copolymer (the content of the volatile organic solvent being less than 1% by weight) was obtained by adding 1.2 g of a 23% ammonia water as a base and 90 g of an ion-exchanged water to the solution (S4) (50 g) containing the fluorine-containing copolymer obtained in Synthesis Example 4, and evaporating MEK under reduced pressure by an evaporator with heating. To this aqueous dispersion was further added the ion-exchanged water to prepare an aqueous dispersion having a solid content of 20% by weight, to which 1% by weight of polypropyleneglycol having a number average molecular weight of 2,000 is added, and which was further sufficiently stirred to obtain aqueous dispersion (SD5).

The dispersion stability and the bubble test of SD5 obtained were evaluated in the above described method, and the obtained results are shown in Table 3.

Preparation Examples 6 and 7

Aqueous dispersions having a solid content of 20% by weight were prepared as in Preparation Example 5 by using 50 g of the fluorine-containing copolymer solutions (S5 and S6) prepared in Synthesis Examples 5 and 6, 6.0 g 10% aqueous sodium hydroxide solution as a base, and 85 g of water. Further, 1% by weight of polypropylene glycol having a number-average molecular weight of 1,000 was added to S6 and sufficiently stirred, and 1% by weight of a polyoxypropylene derivative having an number-average molecular weight of a polypropylene glycol moiety of 900 and an ethylene oxide addition rate of 10% was added to S7 and sufficiently stirred, to obtain aqueous dispersions (SD6 and SD7, respectively).

The dispersion stability and the bubble test of SD6 and SD7 obtained were evaluated in the above described method, and the obtained results are shown in Table 3.

Preparation Example 8

Using 50 g the fluorine-containing polymer solution (S4) obtained in Synthesis Example 4, 6.0 g of 10% aqueous sodium hydroxide solution as a base, and 85 g of water, the same procedures as in Preparation Example 5 were conducted to prepare an aqueous dispersion having a solid content of 20% by weight, and 3% by weight of polypropylene glycol having a number-average molecular weight of 1,000 was added to give an aqueous dispersion (SD8).

The dispersion stability and the bubble test of SD8 obtained were evaluated in the above described method, and the obtained results are shown in Table 3.

Comparative Preparation Example 1

Using the fluorine-containing polymer solution (S1) obtained in Synthesis Example 1, the same procedures as in Preparation Example 1 were conducted to prepare an aqueous dispersion having a solid content of 20% by weight, and then a defoaming agent (BUBREAK 4469 manufactured by Buckman Inc.) was added to give an aqueous dispersion (RD1).

The dispersion stability and the bubble test of RD1 obtained were evaluated in the above described method, and the obtained results are shown in Table 2.

Comparative Preparation Example 2

Using the fluorine-containing polymer solution (S2) obtained in Synthesis Example 2, the same procedures as in Preparation Example 2 were conducted to prepare an aqueous dispersion having a solid content of 20% by weight, and then a defoaming agent (BUBREAK 4484 manufactured by Buckman Inc.) was added to give an aqueous dispersion (RD2).

The dispersion stability and the bubble test of RD2 obtained were evaluated in the above described method, and the obtained results are shown in Table 2.

Comparative Preparation Example 3

Using the solution (S3) obtained in Synthesis Example 3, the same procedures as in Preparation Example 3 were carried out, to give an aqueous dispersion (RD3) having a solid content of 20% by weight.

The dispersion stability and the bubble test of RD3 obtained were evaluated in the above described method, and the obtained results are shown in Table 2.

Comparative Preparation Example 4

Using the fluorine-containing polymer solution (S4) obtained in Synthesis Example 4, the same procedures as in Preparation Example 4 were conducted to prepare an aqueous dispersion having a solid content of 20% by weight, and then a defoaming agent (BUBREAK 4469 manufactured by Buckman Inc.) was added to give an aqueous dispersion (RD4).

The dispersion stability and the bubble test of RD4 obtained were evaluated in the above described method, and the obtained results are shown in Table 3.

Comparative Preparation Example 5

Using the fluorine-containing polymer solution (S5) obtained in Synthesis Example 5, the same procedures as in Preparation Example 5 were conducted to prepare an aqueous dispersion having a solid content of 20% by weight, and then a defoaming agent (BUBREAK 4484 manufactured by Buckman Inc.) was added to give an aqueous dispersion (RD5).

The dispersion stability and the bubble test of RD5 obtained were evaluated in the above described method, and the obtained results are shown in Table 3.

Comparative Preparation Example 6

Using the solution (S6) obtained in Synthesis Example 6, the same procedures as in Preparation Example 6 were carried out, to give an aqueous dispersion (RD6) having a solid content of 20% by weight.

The dispersion stability and the bubble test of RD6 obtained were evaluated in the above described method, and the obtained results are shown in Table 3.

Example 1

Evaluation in the Internal Application Process

An aqueous dispersion (875 g) containing a 0.5 wt % mixture of 40 parts of a beaten LBKP (Leaf Bleached Kraft Pulp) and 60 parts of a beaten NBKP (Needle Bleached Kraft Pulp) having a freeness of 450 mL (Canadian Standard Freeness) was introduced with stirring into the flask, then, 3.1 g of a 1 wt % aqueous solution of a cationic starch (SB GUM-POSIT300 manufactured by SANGUAN WONGSE IND. CO., LTD) was added and the stirring was continued for 1 minute, then 1.3 g of a 1 wt % aqueous solution of a polyamidoamine-epichlorohydrin (WS-4020 manufactured by Japan PMC Co., Ltd., a paper strengthening agent in wet condition) was added and the stirring was continued for 1 minute, then 1.3 g of the diluted aqueous dispersion (SD1) containing 1 wt % of the fluorine-containing copolymer was added and the stirring was continued for 1 minute.

Comparative Examples 1 to 3

Evaluation in the Internal Application Process

The same procedures as in Example 1 were carried out except that the aqueous dispersions (RD1-RD3) containing the fluorine-containing copolymer prepared in Comparative Preparation Examples 1-3 were used instead of the aqueous dispersion (SD1) containing the fluorine-containing copolymer in Example 1. The evaluation results of the water resistance and the oil resistance obtained are shown in Table 2.

TABLE 2

| | | Ex. 1 | Ex. 2 | Ex. 3 | Ex. 4 | Com. Ex. 1 | Com. Ex. 2 | Com. Ex. 3 |
|---|---|---|---|---|---|---|---|---|
| Fluorine-containing copolymer dispersion (Prep. liquid No.) | | Prep. Ex. 1 (SD1) | Prep. Ex. 2 (SD2) | Prep. Ex. 3 (SD3) | Prep. Ex. 4 (SD4) | Com. Prep. Ex. 1 (RD1) | Com. Prep. Ex. 2 (RD2) | Com. Prep. Ex. 3 (RD3) |
| Reactive monomer ingredients (wt. %) | C6FA | 72 | 72 | 72 | 72 | 72 | 72 | 72 |
| | NVP | 8 | 8 | 8 | 8 | 8 | 8 | 8 |
| | AE-200 | | | 2 | | | | 2 |
| | HEMA | 15 | 15 | 10 | 15 | 15 | 15 | 10 |
| | AA | 5 | 5 | 8 | 5 | 5 | 5 | 8 |
| Chain transfer agent | L-SH | 0 | 0.03 | 0 | 0 | 0 | 0.03 | 0 |
| Polypropylene glycol or its derivative (wt. %) | Polypropylene glycol | 1 | 1 | | 3 | | | |
| | Polyoxyethylene polyoxypropylene block polymer | | | 1 | | | | |
| Defoaming agent | BUBREAK4469 | | | | | 1 | | |
| | BUBREAK4484 | | | | | | 1 | |
| Oil resistance | AGR(%) | 0 | 0 | 0 | 0 | 0 | 0 | 0 |
| | RP-2(%) | 0 | 0 | 0 | 0 | 0 | 0 | 0 |
| | Kit | 7 | 7 | 7 | 7 | 7 | 7 | 7 |
| Water resistance | Cobb (g/m$^2$) | 25 | 25 | 24 | 25 | 25 | 25 | 24 |
| Water dispersibility | Stability | Good | Good | Good | Good | Bad | Bad | Good |
| Defoamability & Foam prevention | | Good | Good | Good | Good | Good | Good | Bad |

The resultant pulp slurry was made into paper with a standard hand papermaking machine described in JIS P8222 (The hand papermaking machine was modified to give a paper having a size of 25 cm×25 cm).

The resultant wet paper was pressed between filter paper sheets under a pressure of 3.5 kg/cm$^2$ so as to sufficiently absorb water contained in the wet paper. The wet paper was dried over a drum drier (115° C.×70 seconds) to obtain a water- and oil-resistant paper.

The basis weight of the resultant paper was 70 g/m$^2$. The water resistance (Cobb value) of this hand sheet paper was 100 g/m$^2$ or more, and the oil resistance (Kit value) was 0, and the oil resistance (AGR value) was 100% and the oil resistance (RP-2 value) was 100%.

Examples 2 to 4

Evaluation in the Internal Application Process

The same procedures as in Example 1 were carried out except that the aqueous dispersions (SD2-SD4) containing the fluorine-containing copolymer prepared in Preparation Examples 2-4 were used instead of the aqueous dispersion (SD1) containing the fluorine-containing copolymer in Example 1. The water resistance and the oil resistance of the obtained water- and oil-resistant papers were evaluated, and the results are shown in Table 2.

Table 2 shows that Examples 1-4 are excellent in oil resistance, water resistance and stability, and have less bubbles. On the other hand, Comparative Examples 1 and 2 are excellent in oil resistance, water resistance, defoamability and foam prevention, but poor in stability, and Comparative Example 3 is excellent in oil resistance, water resistance and stability, but has many bubbles.

Example 5

Evaluation in the Surface Application Process

Preparation of a Paper to be Tested:

A paper to be tested was produced by using a test paper machine installed in the Western Michigan University in U.S.A. The production process is shown below.

The types of pulp used were LBKP (Leaf Bleached Kraft Pulp) and NBKP (Needle Bleached Kraft Pulp), and their ratio was 6/4 (L/N) and the freeness of the pulp was 400 mL (Canadian Standard Freeness). In a slurry of the pulp having a concentration of about 2%, a cationized starch Stayloc 400 (manufactured Tate and Lyle) was added in 2 wt % based on the dried pulp weight, and further a size agent of Hercon 70

(manufactured Hercules Corp.) was added in 0.0375 wt % based on the dried pulp weight. A paper was produced from the pulp slurry by using a fourdrinire machine. The basis weight of the paper obtained was 60 g/m2 and the thickness was 0.01 mm. The water resistance (Cobb value) was 80, and the oil resistance (Kit value) was 0.

The water- and oil-resistant paper (treated paper) was produced in the procedure described below using, as an water- and oil-resistant agent, the aqueous dispersion (SD5) containing the fluorine-containing copolymer obtained in Preparation Example 5.

An aqueous starch solution was prepared by dissolving ethylated starch PenfordGum 290 (manufactured Penford Products Corp.) in a hot water of 80° C. or more for 30 minutes. The aqueous starch solution and the aqueous dispersion (SD5) containing the fluorine-containing copolymer obtained in Preparation Example 1 were diluted with water so that the solid content of the aqueous starch solution was 1.5 wt % and the solid content of the aqueous dispersion (SD1) of the fluorine-containing copolymer was 0.2 wt %, to give a water- and oil-resistant composition.

The paper prepared above was dipped in the water- and oil-resistant composition for 5 minutes and dried at 115° C. for 70 seconds with a drum dryer to obtain a test paper.

The evaluation results of the water resistance and the oil resistance of the paper obtained are shown in Table 3.

Examples 6 to 8

Evaluation in the Surface Application Process

Using, as the water- and oil-resistant agent, the aqueous dispersions (SD6-SD8) containing the fluorine-containing copolymer obtained in Preparation Examples 6 to 8, the water- and oil-resistant compositions were obtained by diluting the aqueous dispersions to adjust the solid content to 0.2 wt %. Using each composition, the water resistance and the oil resistance were evaluated in the same way as in Example 5. The obtained results are shown in Table 3.

Comparative Examples 4 to 6

Evaluation in the Surface Application Process

Using, as the water- and oil-resistant agent, the aqueous dispersions (RD4-RD6) containing the fluorine-containing copolymer obtained in Comparative Preparation Examples 4 to 6, the water- and oil-resistant compositions were obtained by diluting the aqueous dispersions to adjust the solid content to 0.2 wt %. Using each composition, the water resistance and the oil resistance were evaluated in the same way as Example 5. The obtained results are shown in Table 3.

TABLE 3

| | | Ex. 5 | Ex. 6 | Ex. 7 | Ex. 8 | Com.s Ex. 4 | Com. Ex. 5 | Com. Ex. 6 |
|---|---|---|---|---|---|---|---|---|
| Fluorine-containing copolymer aqueous dispersion (Prep. liquid No.) | | Prep. Ex. 5 (SD5) | Prep. Ex. 6 (SD6) | Prep. Ex. 7 (SD7) | Prep. Ex. 8 (SD8) | Com. Prep. Ex. 4 (RD4) | Com. Prep. Ex. 5 (RD5) | Com. Prep. Ex. 6 (RD6) |
| Reactive monomer ingredients (wt. %) | C6FA | 77 | 77 | 74 | 77 | 77 | 77 | 74 |
| | HEMA | 13 | 13 | 16 | 13 | 13 | 13 | 16 |
| | AE-200 | 5 | 5 | 5 | 5 | 5 | 5 | 5 |
| | MAA | 5 | 5 | 5 | 5 | 5 | 5 | 5 |
| Chain transfer agent | L-SH | | 0.1 | | | | 0.1 | |
| Polypropylene glycol or its derivative (wt. %) | Polypropylene glycol | 1 | 1 | | 3 | | | |
| | Polyoxyethylene polyoxypropylene block polymer | | | 1 | | | | |
| Defoaming agent | BUBREAK4469 | | | | | 1 | | |
| | BUBREAK4484 | | | | | | 1 | |
| Oil resistance | AGR(%) | 0 | 0 | 0 | 0 | 0 | 0 | 0 |
| | RP-2(%) | 0 | 0 | 0 | 0 | 0 | 0 | 0 |
| | Kit | 8 | 8 | 8 | 8 | 8 | 8 | 8 |
| Water resistance | Cobb (g/m$^2$) | 17 | 18 | 17 | 17 | 18 | 17 | 17 |
| Water dispersibility | Stability | Good | Good | Good | Good | Bad | Bad | Good |
| Defoamability & Foam prevention | | Good | Good | Good | Good | Good | Good | Bad |

Table 3 shows that Examples 5 to 8 are excellent in oil resistance, water resistance and stability, and have less bubbles. On the other hand, Comparative Examples 4 and 5 are excellent in oil resistance, water resistance, defoamability and foam prevention, but poor in stability, and Comparative Example 6 is excellent in oil resistance, water resistance and stability, but has many bubbles.

INDUSTRIAL APPLICABILITY

The present invention relates to a water- and oil-resistant agent for paper which comprises a composition comprising an environment-friendly fluorine-containing copolymer having a fluoroalkyl group having 1-6 carbon atoms, and a polypropylene glycol compound (II), which gives excellent processability, and gives excellent water resistance and oil resistance to paper, since defoamability and foam prevention are good. The present invention also relates to a method of treating paper by using said water- and oil-resistant agent, and can be used for the field of a water- and oil-resistant paper treated by using water- and oil-resistant agent.

The invention claimed is:

1. A water- and oil-resistant agent for paper comprising:
   (I) a fluorine-containing copolymer comprising repeating units derived from:
   (a) a fluorine-containing monomer having a fluoroalkyl group, represented by the general formula:

$$CH_2=C(-X)-C(=O)-Y-Z-Rf \quad (1)$$

wherein
   X is a hydrogen atom, a linear or branched alkyl group having 1 to 21 carbon atoms, a fluorine atom, a chlorine atom, a bromine atom, an iodine atom, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group;
   Y is —O— or —NH— group;
   Z is an aliphatic group having 1 to 10 carbon atoms, an aromatic or cycloaliphatic group having 6 to 10 carbon atoms,
   a —$CH_2CH_2N(R^1)SO_2$— group wherein $R^1$ is an alkyl group having 1 to 4 carbon atoms,
   a —$CH_2CH(OZ^1)CH_2$— group wherein $Z^1$ is a hydrogen atom or an acetyl group,
   a —$(CH_2)_m$—$SO_2$—$(CH_2)_n$— group or a —$(CH_2)_m$—S—$(CH_2)_n$— group wherein m is 1 to 10 and n is 0 to 10, and
   Rf is a linear or branched fluoroalkyl group having 1 to 6 carbon atoms, and
   (b) a (meth)acrylate monomer which does not contain a fluorine atom, and (II) a polypropylene glycol compound having a number-average molecular weight of 300 to 5,000, wherein the (meth)acrylate monomer which does not contain a fluorine atom (b) is at least one selected from compounds represented by the general formulas:

$$CH_2=CX^1C(=O)-O-(RO)_n-X^2 \quad (b1)$$

and $$CH_2=CX^1C(=O)-O-(RO)_n-C(=O)CX^1=CH_2 \quad (b2)$$

wherein $X^1$ is a hydrogen atom or a methyl group,
   $X^2$ is a hydrogen atom or a saturated or unsaturated $C_1$-$C_{22}$ hydrocarbon group,
   R is a $C_2$-$C_6$ alkylene group, and
   n is an integer from 1 to 90,
   wherein the polypropylene glycol compound (II) is added after the polymerization of the fluorine-containing copolymer.

2. The water- and oil-resistant agent for paper according to claim 1, wherein the fluorine-containing copolymer further comprises repeating units derived from at least one monomer selected from the group consisting of:
   (c) a monomer having an anion donating group, and
   (d) a vinyl pyrrolidone monomer represented by the general formula:

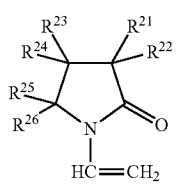

(3)

wherein $R^{21}, R^{22}, R^{23}, R^{24}, R^{25}$ and $R^{26}$ are, the same or different, a hydrogen atom or an alkyl group having 1 to 4 carbon atoms.

3. The water- and oil-resistant agent for paper according to claim 1, wherein the fluoroalkyl group (Rf group) in the monomer (a) is a perfluoroalkyl group.

4. The water- and oil-resistant agent for paper according to claim 1, wherein the fluoroalkyl group (Rf group) in the monomer (a) is a perfluoroalkyl group having 4-6 carbon atoms.

5. The water- and oil-resistant agent for paper according to claim 1, wherein the polypropylene glycol compound (II) is a derivative wherein ethylene oxides are added to both ends of polypropylene glycol.

6. A method for treating paper to be water and oil-resistant, wherein the method comprises the step of applying the water- and oil-resistant agent for paper according to claim 1 to the whole paper including internal parts of paper.

7. The method according to claim 6, wherein the step of applying the water- and oil-resistant agent to the whole paper is the step of applying the water- and oil-resistant agent at a papermaking stage.

8. The method according to claim 6, wherein the water- and oil-resistant agent for paper is used in an amount that a weight ratio of the fluorine atoms is 0.01 to 1.0% by weight based on the weight of the pulp.

9. An internally treated paper obtained by the method according to claim 6.

10. A method for treating paper to be water and oil-resistant, wherein the method comprises the step of applying the water- and oil-resistant agent for paper according to claim 1 to the surface of the paper.

11. The method according to claim 10, wherein the water- and oil-resistant agent for paper is used in an amount that a weight ratio of the fluorine atoms is 0.005 to 0.6% by weight based on the weight of the paper.

12. An externally treated paper obtained by the method according to claim 10.

13. A paper treated with the water- and oil-resistant agent for paper according to claim 1.

14. A composition for treating paper comprising the water- and oil-resistant agent for paper according to claim 1 and an additive.

15. The water- and oil-resistant agent for paper according to claim 1, wherein the (meth)acrylate monomer which does not contain a fluorine atom (b) comprises an oxyalkylene (meth)acrylate represented by the general formula (b1) wherein $X^2$ is a hydrogen atom, R is a saturated hydrocarbon group having 2 carbon atoms, an n is an average of 10 or less.

16. The water- and oil-resistant agent for paper according to claim 1, wherein the (meth)acrylate monomer which does not contain a fluorine atom (b) comprises at least one selected from the group consisting of 2-hydroxyethyl methacrylate and ω-hydroxy-polyoxyethylene acrylate wherein an average polymerization degree (n) of the polyoxyethylene groups is 3 to 10.

17. The water- and oil-resistant agent for paper according to claim 1, wherein the polypropylene glycol compound (II) is at least one selected from the group consisting of:
    (i) polypropylene glycol, and
    (ii) a compound having a polyoxypropylene group and another polyoxyalkylene group wherein the carbon atom number of the alkylene group is 2 or 4.

18. The water- and oil-resistant agent for paper according to claim 1, wherein the polypropylene glycol compound (II) has a number-average molecular weight of 500 to 3,000.

\* \* \* \* \*